US006734278B2

(12) United States Patent
Kratschmer et al.

(10) Patent No.: US 6,734,278 B2
(45) Date of Patent: May 11, 2004

(54) PRODUCTION OF POLYESTER CARBONATES

(75) Inventors: Silke Kratschmer, Krefeld (DE); Wolfgang Alewelt, Krefeld (DE); Friedrich-Karl Bruder, Krefeld (DE); Wilfried Haese, Odenthal (DE); Rolf Wehrmann, Krefeld (DE); Peter Fischer, Köln (DE); Marco Roelofs, Krefeld (DE); Lothar Bunzel, Kempen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/263,221

(22) Filed: Oct. 2, 2002

(65) Prior Publication Data
US 2003/0139564 A1 Jul. 24, 2003

(30) Foreign Application Priority Data
Oct. 5, 2001 (DE) ........................ 101 49 042

(51) Int. Cl.$^7$ .............................................. C08G 64/00
(52) U.S. Cl. .................... 528/196; 264/176.1; 264/219; 359/109; 369/47; 528/198
(58) Field of Search .............................. 264/176.1, 219; 359/109; 369/47; 528/196, 198

(56) References Cited

U.S. PATENT DOCUMENTS

| | | | | |
|---|---|---|---|---|
| 4,459,384 A | | 7/1984 | Matzner et al. .............. 524/876 |
| 4,983,706 A | | 1/1991 | Fontana et al. .............. 528/176 |
| 5,025,081 A | | 6/1991 | Fontana et al. .............. 528/176 |
| 5,777,009 A | * | 7/1998 | Pan et al. .................... 524/164 |
| 5,807,965 A | | 9/1998 | Davis ......................... 528/196 |
| 6,232,429 B1 | | 5/2001 | Banach et al. .............. 528/176 |
| 6,291,630 B1 | * | 9/2001 | Konig et al. ................ 528/196 |
| 6,399,739 B1 | * | 6/2002 | McCloskey et al. ........ 528/196 |
| 6,596,840 B1 | * | 7/2003 | Kratschmer et al. ........ 528/196 |

FOREIGN PATENT DOCUMENTS

| | | |
|---|---|---|
| DE | 1 013 127 | 8/1957 |
| EP | 0 216 106 | 4/1987 |
| JP | 2000-248057 | 9/2000 |
| WO | 00/26275 | 5/2000 |

* cited by examiner

Primary Examiner—Terressa Boykin
(74) Attorney, Agent, or Firm—Joseph C. Gil; John E. Mrozinski; James R. Franks

(57) ABSTRACT

The present invention provides a two-stage process for the production of polyester carbonates with aliphatic dicarboxylic acids, the polyester carbonates obtained thereby, a process for the production of extrudates and molded articles from the polyester carbonates, and the extrudates and molded articles obtained thereby.

40 Claims, No Drawings

US 6,734,278 B2

PRODUCTION OF POLYESTER CARBONATES

FIELD OF THE INVENTION

The present invention relates, in general to processes for the production of carbonates, and more specifically, to a two-stage process for the production of polyester carbonates with aliphatic dicarboxylic acids, the polyester carbonates obtained thereby, methods for the production of extrudates and molded articles from these polyester carbonates and the extrudates and molded articles obtained thereby.

BACKGROUND OF THE INVENTION

The transesterification process is well known in the art for the incorporation of aromatic dicarboxylic acids and is described, for example, in U.S. Pat. No. 4,459,384. The incorporation of aliphatic dicarboxylic acids is described in JP-A 2000 248 057.

The production of polyester carbonates from difunctional, aliphatic carboxylic acids and dihydroxy compounds via the phase interface process is described, for example, in EP-A 433 716, U.S. Pat. No. 4,983,706 and U.S. Pat. No. 5,274,068. EP-A 433 716 teaches that although the known carboxylic acids for polyester carbonates can be incorporated in significant amounts, this is possible only by a complicated, pH-controlled procedure.

In addition, the polyester carbonates produced by the phase interface process contain amounts of anhydrides of the employed dicarboxylic acids and/or free acid that are too low, which is undesirable according to EP-A 926 177. It is therefore desirable to incorporate the dicarboxylic acids as completely as possible into the polyester carbonate so that as many ester bonds as possible, in addition to few acid or anhydride structures, are present in the product, as those adversely affect the stability of the polyester carbonate.

In contrast to the complicated phase interface process, polyester carbonates may be synthesized considerably more easily by the transesterification process. Although the polyester carbonates contain hardly any anhydride structures, as is disclosed in DE Application No. 10131127.3, these compounds normally exhibit a fairly pronounced intrinsic coloration, which seriously affects their suitability for most applications.

SUMMARY OF THE INVENTION

The present invention, therefore, provides a process for the production of a polyester carbonate that is obtained without the need for a constant, complicated pH control, but that has a good intrinsic color and small amounts of anhydride structures. This has surprisingly been achieved by combining transesterification and phase interface processes.

DETAILED DESCRIPTION OF THE INVENTION

The present invention will now be described for purposes of illustration and not limitation.

The present invention provides a process for the production of polyester carbonates, wherein condensation takes place in a first stage as a melt transesterification process to form oligomers, which are condensed in a second stage by the phase interface process to form the polymeric polyester carbonate.

As the melt transesterification process for the production of the oligocarbonates in the first stage of the process according to the present invention, there may in principle be used any melt transesterification process for the production of polycarbonate known in the art. Such processes are described, for example, in the following applications and issued patents: DE-A-1 031 512, U.S. Pat. No. 3,022,272, U.S. Pat. No. 5,340,905, U.S. Pat. No. 5,399,659, DE-A 4 312 390, U.S. Pat. No. 5,912,318, U.S. Pat. No. 5,932,683, U.S. Pat. No. 5,912,289, WO 00/26 276 and EP-A 620 240. A process for the production of oligocarbonates is likewise described in German application no. 1 01 14 808.9. Further details of the melt transesterification process in general may be found, for example, in Hermann Schnell, Chemistry and Physics of Polycarbonates, Polymer Reviews, Vol. 9, 1964, pp. 44 to 51.

As the phase interface process for the condensation of the oligomers to the polymer in the second stage of the process according to the present invention, there may in principle be used any phase interface process for the production of polycarbonate known in the art. Such processes are described, for example, in Schnell, "Chemistry and Physics of Polycarbonates", Polymer Reviews, Volume 9, Interscience Publishers, New York, London, Sydney 1964, pp. 33 ff., D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18, (1980), pp. 75 ff., D. Freitag, U. Grigo, P. R. Müller, N. Nouvertne', BAYER A G, "Polycarbonates" in Encyclopedia of Polymer Science and Engineering, Volume 1 1, Second Edition, 1988, pp. 651 ff., and finally Dres, U. Grigo, K. Kircher and P. R. Müller "Polycarbonate" in Becker/Braun, Kunststoff-Handbuch, Vol. 3/1, Polycarbonate, Polyacetale, Polyester, Celluloseester, Carl Hanser Verlag Munich, Vienna 1992, pp. 118 ff. and 138 ff.

According to the process of the present invention, in the first stage, a mixture of dihydroxy compound and diaryl carbonate is heated in an inert gas atmosphere and under reduced pressure to a temperature of 200° C.–290° C., following which, the resultant hydroxyaryl component is distilled off. A dicarboxylic acid or dicarboxylic acid mixture is then added and the reaction mixture is heated in vacuo and condensed to form the oligomer. At each point, the pressure is selected in a way that the hydroxyaryl component can be distilled off without any problem. In the second stage, the resultant oligomer is condensed in a phase interface process to form the polyester carbonate. For this stage, the oligomer is dissolved in an inert solvent before the condensation with phosgene takes place in the presence of aqueous, alkaline solution. The reaction temperature is between 0° C. and 50° C. The organic solution is purified by a subsequent washing and the solvent is removed.

The polyester carbonate obtained according to the invention is light colored, i.e. it has a color index of <0.1.

The remaining definitions, parameters and explanations given above, or subsequently, as generally applicable or applicable in preferred ranges may also be combined arbitrarily with one another, i.e. between the respective ranges and preferred ranges. They apply as appropriate to the end products as well as to the starting products and intermediate products, and to processes as well as process stages.

Dicarboxylic acids suitable for the process according to the present invention are those of the formula (I)

HOOC—T—COOH    (I)

wherein T represents a branched or linear, saturated or unsaturated alkyl, arylalkyl or cycloalkyl radical consisting of 4–38 carbon atoms.

Preferred are saturated, linear alkyl diacids with 6–40 carbon atoms, particularly preferably those with 12 to 36 carbon atoms. Among these classes of substances, fatty acids are especially suitable, particularly preferably hydrogenated, dimeric fatty acids.

Moreover, the dicarboxylic acids of formula (I) can be mixed with aliphatic, araliphatic or aromatic hydroxy carboxylic acids with 4 to 40 carbon atoms like e.g. salicylic acid oder p-hydroxybenzoic acid.

Instead of the diacids their precursor compounds like e.g. anhydrides, lactones or phenyl esters may be used, provided that the free acids are liberated in situ under the conditions of the oligomer formation.

Preferred dicarboxylic acids of the formula (I) or mixtures of such acids are: adipic acid, cis or trans-1,2-cyclohexanedicarboxylic acid, cis or trans-1,3-Cyclohexanedicarboxylic acid, cis or trans-1,4-Cyclohexanedicarboxylic acid, sebacic acid, α,ω-dodecanedioic acid, α,ω-octadecanoic acid, phthalic acid, isophthalic acid, terephthalic acid, hydrogenated dimeric fatty acids, such as for example Pripol 1009 from Uniqema.

Hydrogenated dimeric fatty acids are acids, which are produced by dimerization of non-saturated monobasic fatty acids with 16 to 22 carbon atoms and subsequent hydrogenation. The required fatty acids can be derived from animal or plant sources. Synthesis and properties are e.g. described in Encyclopedia of Chemical Technology, Vol. 8, 4$^{th}$ ed., John Wiley & Sons: 1993, page 223–237.

Pripol 1009 is a mixture of hydrogenated dimeric fatty acids whose composition is, according to information provided by Uniqema, roughly as follows:

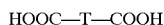

| | Structure (in each case various isomers) | Uniqema Data |
|---|---|---|
| Linear | | ca. 30% |
| Cyclic | | ca .50% |
| Bicyclic | | |
| Aromatic | | ca. 15–20% |
| Aromatic | | bicyclic |

Particularly preferred are dodecanedioic acid and hydrogenated dimeric fatty acids. Hydrogenated dimeric fatty acids are most particularly preferred.

One or more diverse dicarboxylic acids of the formula (I) may be used.

The employed dicarboxylic acids as well as the remaining raw materials employed, added chemicals and auxiliary substances that are used should preferably be as pure as possible. In the case of commercial products, the purity often varies greatly. In particular, fatty acids or hydrogenated, dimerized fatty acids may contain considerable amounts of byproducts that were formed during production.

Thus hydrogenated dimeric fatty acids are preferred, which besides the stated structural elements contain only small amounts of non-saturated aliphatic groups, i.e. dimeric fatty acids with iodine numbers below 15 are preferred.

Furthermore, dimeric fatty acids may contain small amounts of mono- or polybasic acids. Products with a very low concentration of these components, especially very low amounts of tribasic acids are especially suited for the polyester carbonates of the invention. Thus hydrogenated dimeric fatty acids with a concentration of acids with a functionality of three or higher below 1.5% as determined by gas chromatography are preferred.

In the process according to the present invention, the dicarboxylic acids with respect to the dihydroxy compound may be used in a molar ratio X:1, where 0<X<1, preferably 0.01<X<0.99, particularly preferably 0.02<X<0.5 and most particularly preferably 0.08<X<0.2.

Suitable dihydroxy compounds for the process according to the present invention are those of the formula (II)

HO—Ar—OH            (II)

wherein Ar represents an aromatic radical with 6 to 30 carbon atoms, preferably with 6 to 25 carbon atoms, which may contain one or more aromatic nuclei, may be substituted, and may contain aliphatic or cycloaliphatic radicals and/or alkylaryl radicals or heteroatoms as bridge members.

Examples of suitable dihydroxy compounds of the formula (II) include, but are not limited to, hydroquinone, resorcinol, dihydroxydiphenyls, bis-(hydroxyphenyl)alkanes, bis-(hydroxyphenyl)cycloalkanes, bis-(hydroxyphenyl)sulfides, bis-(hydroxyphenyl)ethers, bis-(hydroxyphenyl)ketones, bis-(hydroxyphenyl)sulfones, bis-(hydroxyphenyl)sulfoxides, α,α'-bis-(hydroxyphenyl)diisopropylbenzenes, as well as their nuclear-alkylated and nuclear-halogenated compounds.

Those and further suitable other diphenols are described, for example, in U.S. Pat. Nos. 3,028,365, 3,148,172, 3,275,601, 2,991,273, 3,271,367, 2,062,781, 2,970,131 and 2,999,846, in DE-A 1 570 703, 2 063 050, 2 063 052, 2 211 0956, FR-B 1 561 518 and in the monograph "H. Schnell, Chemistry and Physics of Polycarbonates, Interscience Publishers, New York 1964".

Preferred dihydroxy compounds include, but are not limited to, 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)cyclohexane, 1,1-bis-(4-hydroxyphenyl)-4-methylcyclohexane, α,α'-bis-(4-hydroxyphenyl)-p-diisopropylbenzene, α,α'-bis-(4-hydroxyphenyl)-m-diisopropylbenzene, bis-(4-hydroxyphenyl)sulfone, bis-(4-hydroxyphenyl)methane, 1,1-bis-(4-hydroxyphenyl)-3,3,5-trimethylcyclohexane, bis-(2,6-dimethyl-4-hydroxyphenyl)propane, bis-(4-hydroxyphenyl)hexafluoropropane, (4-hydroxyphenyl)-1-phenylethane, (4-hydroxyphenyl)diphenylmethane, dihydroxydiphenyl ether, 4,4'-thiobisphenol, bis-(4-hydroxyphenyl)-1-(1-naphthyl)ethane, bis-(4-hydroxyphenyl)-1-(2-naphthyl)ethane, dihydroxy-3-(4-hydroxyphenyl)-1,1,3-trimethyl-1H-inden-5-ol, dihydroxy-1-(4-hydroxyphenyl)-1,3,3-trimethyl-1H-inden-5-ol, and 2,2',3,3'-tetrahydro-3,3,3',3'-tetramethyl-1,1'-spirobi[1H-inden]-5,5'-diol, 1,1-bis-(3-methyl-4-hydroxyphenyl)cyclohexane, 2,2-bis-(3-methyl-4-hydroxyphenyl)propane.

Particularly preferred are resorcinol, bis-(4-hydroxyphenyl)-1-(1-naphthyl)ethane, bis-(4-hydroxyphenyl)-1-(2-naphthyl)ethane, 2,2-bis-(4-hydroxyphenyl)propane, α,α'-bis-(4-hydroxyphenyl)-p-diisopropylbenzene, α,α'-bis-(4-hydroxyphenyl)-m-diisopropylbenzene, 1,1-bis-(4-hydroxyphenyl)cyclohexane, 4,4'-dihydroxydiphenyl, bis-(4-hydroxyphenyl)-3,3,5-trimethylcyclohexane, bis-(4-hydroxyphenyl)diphenylmethane, dihydroxy-3-(4-hydroxyphenyl)-1,1,3-trimethyl-1H-inden-5-ol, dihydroxy-1-(4-hydroxyphenyl)-1,3,3-trimethyl-1H-inden-5-ol, 2,2',3,3-tetrahydro-3,3,3',3-tetramethyl-1,1'-spirobi[1H-inden]-5,5'-diol, 1,1-Bis-(3-methyl-4-hydroxyphenyl)cyclohexane, and 2,2-Bis-(3-methyl-4-hydroxyphenyl)propane.

Most particularly preferred are bis-(4-hydroxyphenyl)-3,3,5-trimethylcyclohexane, 4,4'-dihydroxydiphenyl, and 2,2-bis-(4-hydroxyphenyl)propane. Most preferred is bis-(4-hydroxyphenyl)-3,3,5-trimethylcyclohexane.

One or more diverse diphenols of the formula (II) may be used.

The process according to the present invention may be carried out continuously or batchwise. According to the process of the present invention, in the first stage, a mixture of dihydroxy compound and diaryl carbonate is heated in an inert gas atmosphere and under reduced pressure to a temperature of 200–290° C., preferably 230–290° C., particularly preferably 250–280° C., and the hydroxyaryl component thereby formed is distilled off. The pressure is chosen so that the hydroxyaryl component can be distilled off without any problem. The dicarboxylic acid or dicarboxylic acid mixture is then added, and the reaction mixture is condensed to form the oligomer under a vacuum over 0.5–4 hours, preferably 2–3 hours. The pressure after the addition of the acid up to the end of the reaction should be ≧60 mbar for at least half of the time.

For the synthesis of the oligomers via the melt transesterification process, there may be used, apart from diphenols and diacids, also diaryl carbonates. Diaryl carbonates within the context of the present invention are those carbonic acid diesters of the formula (III)

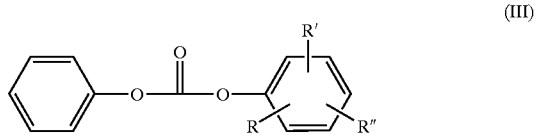

(III)

and the formula (IV),

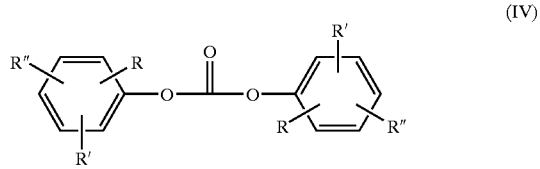

(IV)

wherein R, R'and R" independently represent H, optionally branched $C_1$–$C_{34}$-alkyl/cycloalkyl, $C_7$–$C_{34}$-alkaryl or $C_6$–$C_{34}$-aryl. Compounds of the formulae (III) and (IV) include, but are not limited to, diphenyl carbonate, butylphenyl-phenyl carbonate, di-butylphenyl carbonate, isobutylphenyl-phenyl carbonate, di-isobutylphenyl carbonate, tert.-butylphenyl-phenyl carbonate, di-tert.-butylphenyl carbonate, n-pentylphenyl-phenyl carbonate, di-(n-pentylphenyl) carbonate, n-hexylphenyl-phenyl carbonate, di-(n-hexylphenyl) carbonate, cyclohexylphenyl-phenyl carbonate, di-cyclohexylphenyl carbonate, phenylphenol-phenyl carbonate, di-phenylphenol carbonate, isooctylphenyl-phenyl carbonate, di-isooctylphenyl carbonate, n-nonylphenyl-phenyl carbonate, di-(n-nonylphenyl) carbonate, cumylphenyl-phenyl carbonate, di-cumylphenyl carbonate, naphthylphenyl-phenyl carbonate, di-naphthylphenyl carbonate, di-tert.-butylphenyl-phenyl carbonate, di-(di-tert.-butylphenyl) carbonate, dicumylphenyl-phenyl carbonate, di-(dicumylphenyl) carbonate, 4-phenoxyphenyl-phenyl carbonate, di-(4-phenoxyphenyl) carbonate, 3-pentadecylphenyl-phenyl carbonate, di-(3-pentadecylphenyl) carbonate, tritylphenyl-phenyl carbonate and di-tritylphenyl carbonate, preferably diphenyl carbonate, tert.-butylphenyl-phenyl carbonate, di-tert.-butylphenyl carbonate, phenylphenol-phenyl carbonate, di-phenylphenol carbonate, cumylphenyl-phenyl carbonate, and di-cumylphenyl carbonate, particularly preferably diphenyl carbonate.

The carbonic acid diesters are used in a molar ratio of 60 to 100 mole %, preferably 70 to 90 mole %, especially preferred 75 to 85 mole % relative to the sum of dihydroxy compound and dicarboxylic acid. Mixtures of the carbonic acid diesters or dicarboxylic acids mentioned above may also be used. Those catalysts conventionally employed for melt transesterification, preferably ammonium or phosphonium compounds, may be used for the synthesis of the oligomer. The catalysts are preferably used in amounts of 0.0001 to 0.8 mole %, particularly preferably in amounts of 0.01 to 0.6 mole %, referred to total amount of dicarboxylic acid and dihydroxy compound.

Phosphonium salts are particularly preferably used as the first stage catalyst for the production of the polyester carbonates according to the present invention, optionally in combination with other suitable catalysts that do not lead to an intensified intrinsic color.

Phosphonium salts within the meaning of the present invention are those of the formula (V),

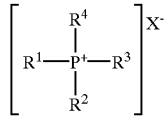

(V)

wherein $R^{1-4}$ may independently represent $C_1$–$C_{10}$-alkyl, $C_6$–$C_{10}$-aryl, $C_7$–$C_{10}$-aralkyl or $C_5$–$C_6$-cycloalkyl radicals, preferably methyl or $C_6$–$C_{14}$-aryl radicals, particularly preferably methyl or phenyl, and $X^-$ may be an anion such as hydroxide, sulfate, hydrogen sulfate, hydrogen carbonate, carbonate, a halide, preferably chloride, or an alcoholate of the formula OR, in which R may be $C_6$–$C_{14}$-aryl or $C_7$–$C_{12}$-aralkyl, preferably phenyl.

Preferred catalysts are tetraphenylphosphonium chloride, tetraphenylphosphonium hydroxide, and tetraphenylphosphonium phenolate, with tetraphenylphosphonium phenolate being particularly preferred.

The oligomers obtained in the process of the present invention have mean weight average molecular weights $M_w$ of 1,000 to 15,000, preferably 1,000 to 10,000, particularly preferably 1,500 to 5,000, as determined by MALDI-MS or by measurement of the relative solution viscosity in dichloromethane or in mixtures of equal amounts by weight of phenol and o-dichlorobenzene, calibrated by light scattering measurements, as described in Hans-Georg Elias, Makromoleküle, Hüthig & Wepf Verlag, Basle, N.Y. 1990, $5^{th}$ edition, pp. 85–93.

The oligomer should not contain any free acid or acid groups, i.e., the acid number must be <0.01, before it can be used in the second stage of the present invention. The OH number is measured to determine the required minimum amounts of phosgene, chain terminator and catalyst.

In the second stage, the oligomers obtained for the condensation via the phase interface process are dissolved in an inert solvent, preferably methylene chloride, or an inert solvent is added directly to the oligomer melt.

The oligomer solution is condensed with phosgene in the presence of an aqueous, alkaline solution. The reaction temperature is between 0° and 50° C., preferably between 10° and 40° C., particularly preferably between 15° and 35° C. As alkaline components, there may be used all water-soluble or water-dispersible alkali and alkaline earth metal hydroxides, but preferably sodium hydroxide, potassium hydroxide, magnesium hydroxide and/or calcium hydroxide (slurry of calcium oxide in water), or mixtures thereof. Sodium hydroxide is particularly preferred, in an amount of at least 100 mole %, preferably 600–100 mole %, particularly preferably 400–100 mole % and especially 120–110 mole %, relative to the number of hydroxy groups in the reaction mixture.

Suitable catalysts are ammonium and/or phosphonium compounds or tertiary amines, as are described in the literature, in particular N-ethylpiperidine, N-methylpiperidine, triethylamine and tributylamine, or mixtures thereof. The catalysts may be added in one amount, or alternatively, in several amounts over time intervals (batch process) or spatial intervals (continuous process). The preferred amount is 0.005 to 5 mole %, particularly preferably 0.01 to 3.5 mole %, relative to the number of hydroxy groups in the reaction mixture.

The molecular weight is controlled via a chain terminator. The added amount of chain terminator is matched to the desired molecular weight of the polyester carbonate. The molecular weight ($M_w$) is chosen so as to permit processing of the carbonate, and is preferably in the range from 15,000 to 40,000, particularly preferably 17,000 to 30,000. The amount of the chain terminator is therefore usually, depending on the desired molecular weight, 5 to 0.25 mole %, preferably 4 to 1 mole %, relative to the number of hydroxy groups in the reaction mixture. The addition of the chain terminators may take place before, during or after the phosgenation.

Suitable chain terminators include monophenols as well as monocarboxylic acids. Suitable monophenols include, but are not limited to, phenol, alkylphenols such as cresols, p-tert.-butylphenol, p-n-octylphenol, p-iso-octylphenol, p-n-nonylphenol and p-iso-nonylphenol, halogenated phenols such as p-chlorophenol, 2,4-dichlorophenol, p-bromophenol and 2,4,6-triibromophenol and/or mixtures thereof. Preferred chain terminators are p-tert.-butylphenol or phenol, particularly preferably p-tert.-butylphenol.

Suitable monocarboxylic acids are benzoic acid, alkylbenzoic acids and halogenated benzoic acids.

Further bisphenol and/or further oligomer may, if desired, be added in arbitrary amounts to the oligomer in order to adjust the content of diacid in the polyester carbonate. The added bisphenol or oligomer may be identical to or different from, respectively, the bisphenol used in the oligomer or to the oligomer per se. Mixtures of various oligomers and/or bisphenols may also be used. Preferred amounts of added bisphenol are between 30:70 and 0:100, particularly preferably 20:80 to 3:97 in weight ratio referred to the oligomer.

The polyester carbonates may be specifically branched and may therefore contain minor amounts, ranging from 0.02 to 3.6 mole %, preferably 0.05 to 2.5 mole %, referred to the total amount of dicarboxylic acid and dihydroxy compound, of branching agents. Suitable branching agents are the trifunctional or multifunctional compounds known in polycarbonate chemistry, in particular, those containing three or more phenolic OH groups.

It is also possible to use a certain amount of trifunctional aliphatic, araliphatic or aromatic carboxylic acids or acids with even higher functionality as branching agents e.g. during the first step, i.e. the synthesis of the oligomers. Examples for suitable acids are hydrogenated trimeric fatty acids or trimesic acid.

Suitable branching agents include, but are not limited to, phloroglucinol, 4,6-dimethyl-2,4,6-tris-(4-hydroxyphenyl)-heptene-2,4,6-dimethyl-2,4,6-tris-(4-hydroxyphenyl) heptane, 1,3,5-tris-(4-hydroxyphenyl)benzene, 1,1,1-tris-(4-hydroxyphenyl)ethane, tris-(4-hydroxyphenyl)-phenylmethane, 2,2-bis-[4,4-bis-(4-hydroxyphenyl) cyclohexyl]propane, 2,4-bis-(4-hydroxyphenylisopropyl) phenol, 2,6-bis-(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl)orthoterephthalic acid ester, tetra-(4-hydroxyphenyl)methane, tetra-(4-(4-hydroxyphenylisopropyl)phenoxy)methane and 1,4-bis-(4', 4"-dihydroxytriphenyl)methyl)-benzene as well as 2,4-dihydroxybenzoic acid, trimesic acid, cyanuric chloride and 3,3-bis-(3-methyl-4-hydroxyphenyl)-2-oxo-2,3-dihydroindole, preferably hydrogenated trimeric fatty acids, 1,1,1-tris-(4-hydroxy-phenyl)ethane and isatin biscresol.

The branching agents may be added at any arbitrary stage in the process, and therefore in the first stage in the production of the oligomers in the melt transesterification, as well as in the second stage in the production of the polyester carbonates in the phase interface process. In the second stage, the branching agents may either be mixed with the diphenols and the chain terminators in the aqueous alkaline phase, or may be added, dissolved in an organic solvent, before the phosgenation. Such measures for the production of the polyester carbonates are known to the person skilled in the art.

The solids content of the polyester carbonate solution to be washed may vary, depending on the molecular weight of the polyester carbonate, between 0.5 wt. % and 30 wt. % of polyester carbonate. With molecular weights ($M_w$) between 8,000 and 50,000, preferred polyester carbonate solids contents are between 2 wt. % and 25 wt. %, more preferably between 5 wt. % and 22 wt. % polyester carbonate, particularly preferred polyester carbonate solids contents being between 7 wt. % and 20 wt. %. With molecular weights ($M_w$)>50,000, polyester carbonate solids contents are between 2 wt. % and 15 wt. %.

As organic solvent for the polyester carbonate solution to be washed, those solvents are used that dissolve the relevant polycarbonate and form with water a two-phase synthesis mixture, such as aliphatic, optionally branched, partially or totally halogenated solvents containing 1 to 10 carbon atoms, chlorine or fluorine being used as halogen, such as methylene chloride, trichloroethane, tetrachloroethane, and also aromatic, optionally substituted compounds containing 6 to 18 carbon atoms such as benzene, toluene, o/m/p-xylene, methoxybenzene or ethoxybenzene, diphenyl, diphenyl ether, chlorobenzene, o/m/p-dichlorobenzene, as well as mixtures thereof.

To alter the properties of the polyester carbonates of the present invention, auxiliary substances and reinforcing agents may be admixed therewith. Such substances and agents include, but are not limited to, heat stabilizers and UV stabilizers, flow auxiliaries, mold release agents, flame-proofing agents, pigments, finely comminuted minerals and fibrous substances, for example alkyl and aryl phosphites, phosphates, phosphanes, low molecular weight carboxylic acid esters, halogenated compounds, salts, chalk, quartz flour, glass fibers and carbon fibers, pigments, and combinations thereof. Such compounds are described, for example, in WO 99/55772, pp. 15–25, and in "Plastics Additives", R. Gächter and H. Müller, Hanser Publishers 1983.

Furthermore, other polymers may also be added to the polyester carbonates according to the invention, for example, polyolefins, polyurethanes, polyesters, acrylonitrile-butadiene-styrene copolymer and polystyrene. Those substances are preferably admixed with the finished polyester carbonate in conventional machine units but, depending on requirements, may also be added at another stage of the production process.

The polyester carbonates obtainable by the process according to the present invention may be processed in the usual way in conventional machinery, for example, in extruders or injection molding machines, into any desired molded articles, for example, into films or sheets.

The present invention also provides for the use of the polyester carbonates and/or of the corresponding molding compositions according to the invention for the production of molded articles and extrudates, in particular optical articles, films and sheets, or the corresponding molded articles, preferably optical articles, produced from the polyester carbonates according to the invention.

Examples of this use include, but are not limited to, safety windows, extrusion and solution films for displays or electric motors, production of transparent panels, production of traffic light housings or road signs, production of precision injection molded parts, optical applications such as optical storage media (CD, DVD, MD), production of light fittings, sports articles, applications in the automobile sector, household articles and electrical and electronic equipment, or for other applications such as for example:

1. Safety windows, such as are required in many parts of buildings, vehicles and aircraft, as well as helmet shields;
2. Production of films, especially ski films;
3. Production of blow-molded parts (e.g., U.S. Pat. No. 2,964,794), such as one to five gallon water containers;
4. Production of transparent panels, in particular cavity-type panels, for example for covering buildings, such as railway stations, glasshouses and lighting installations;
5. Production of optical data storage media;
6. Production of traffic light housings or road signs;
7. Production of foam materials (e.g., DE-B 1 031 507;
8. Production of threads and wires (e.g., DE-B 1 137 167 and DE-A 1 785 137);
9. As translucent plastics materials containing glass fibers for light technology purposes (e.g., DE-A 1 554 020);
10. As translucent plastics materials containing barium sulfate, titanium dioxide and/or zirconium dioxide and/or organic polymeric acrylate rubbers (EP-A 634 445, EP-A 269324) for the production of transparent and light-scattering molded parts;

11. Production of small precision injection-molded parts, such as lens mountings. For this purpose, polyester carbonates are used with a content of glass fibers which optionally may additionally contain about 1–10 wt. % of $MoS_2$, referred to the total weight;
12. Production of optical instrument parts, in particular lenses for photographic cameras and film cameras (e.g., DE-A 2 701 173);
13. As light transmission carriers, in particular as fiber-optic cables (e.g., EP-A1 0 089 801);
14. As electrical insulation materials for electrical conductors/leads and for plug housings and plug-and-socket connectors;
15. Production of mobile telephone housings having improved resistance to perfume, aftershave lotion and sweat;
16. Network interface devices;
17. As carrier material for organic photoconductors;
18. Production of lights, e.g., spotlights, vehicle headlamps, scattered light panels or internal lenses;
19. For medical applications, e.g., oxygenators, dialysis equipment;
20. For foodstuff applications, such as bottles, dishes and chocolate molds;
21. For applications in the automobile sector where contact with fuels and lubricants may occur, such as bumpers, optionally in the form of suitable blends with ABS or suitable rubbers;
22. For sports articles, such as slalom poles or ski shoe buckles;
23. For household articles, such as kitchen sink units and letter box housings;
24. For housings, such as electrical distribution cabinets;
25. Housings for electric toothbrushes and hairdryer housings;
26. Transparent washing machine portholes with improved resistance to the washing solution;
27. Protective goggles and optical correction glasses;
28. Lamp coverings for kitchen appliances with improved resistance to kitchen vapors, in particular oil vapors;
29. Packaging foils for medicaments;
30. Chip boxes and chip carriers; and
31. For various other applications, such as stable doors or animal cages.

The polyester carbonates according to the present invention are most particularly suitable for the production of optical and magneto-optical articles, in particular, data storage media such as CD, DVD, MD and derivatives thereof, i.e. writeable and rewriteable data carriers, e.g. CD-ROM, CD-R, CD-RW, DVD-ROM, HD-DVD etc.

EXAMPLES

The acid number was measured according to DIN EN ISO 3682, and the OH number according to DIN EN ISO 4629.

The relative solution viscosity was determined in dichloromethane at a concentration of 5 g/l at 25° C.

The content of phenolic OH was obtained by IR measurements. For this purpose, a difference measurement of a solution of 2 g of polymer in 50 ml of dichloromethane was made compared to pure dichloromethane, and the extinction difference was determined at 3582 $cm^{-1}$.

The content in wt. % of the esterified acid (x) in the polyester carbonate was determined using a solution of 1 g of polyester carbonate in 100 ml of dichloromethane. For this, an IR spectrum of the solution was recorded and evaluated according to the PLS method. In the PLS evaluation, the spectral ranges 1919–1581 $cm^{-1}$ as well as 2739–2894 $cm^{-1}$ were used. The calibration was carried out with 29 samples of known composition.

The determination of the free carboxylic acid groups in the polyester carbonate (y) was likewise carried out by IR spectroscopy on the above solution. Spectra of dichloromethane, water vapor and an acid-free and anhydride-free polyester carbonate with 20 wt. % Pripol were subtracted and the extinction difference was evaluated at 1709 $cm^{-1}$. The measurement was calibrated using polyester carbonates of different Pripol contents. Values of <0.01 were counted as zero.

The determination of the anhydride structure (z) was carried out by means of the above IR spectrum by evaluating the extinction at 1816 $cm^{-1}$ minus the extinction at 1860 $cm^{-1}$ and minus a contribution of 0.031. The method was not calibrated. The color number was determined as the difference of the extinction at 420 nm and 700 nm in dichloromethane at a concentration of 2.4 g/50 ml and a layer thickness of 10 cm.

Example 1

1240.00 g (4.0 moles) of bisphenol TMC, 771.1916 g (3.6 moles) of diphenyl carbonate and 0.9874 g ($1.6 \times 10^{-3}$ mole) of tetraphenylphosphonium phenolate were weighed out into a stirred vessel. The vessel was freed from atmospheric oxygen by applying a vacuum and flushing with nitrogen (three times) and the mixture was melted at 150° C. and 100 mbar. The temperature was raised to 190° C. and the phenol formed was distilled off over 30 minutes. The temperature was increased to 235° C., then slowly adjusted to 270° C., and the mixture was stirred for 1 hour. 336.22 g (0.6 mole) of Pripol 1009 was added and the reaction mixture was stirred for 90 minutes at 100 mbar. The vacuum was slowly reduced to <2 mbar and the mixture was stirred for a further 50 minutes. A clear resin was obtained that had an acid number of 0 and an OH number of 60. It was used further in the phase interface process as described below.

36.86 g of the resin obtained were dissolved while stirring in 277.1 g of methylene chloride in a 1 l capacity flask equipped with flow spoiler, metal stirrer, pH electrode, feed tube, thermometer and dropping funnel. After the resin had completely dissolved, a solution of 1.94 g of bisphenol TMC, 2.5 g of sodium hydroxide and 277.1 g of distilled water was added and stirred for 5 minutes. 7.6 g of phosgene were introduced at a temperature of 15° C.–35° C. and at a pH of 11–13. After the end of the phosgenation, the mixture was stirred for 5 minutes, following which 0.28 g of p-tert.-butylphenol was metered in. After a further 5 minutes, 0.2 g of N-ethylpiperidine was added. After stirring for 30 minutes, the phases were separated, and the organic phase was acidified with ca. 10% hydrochloric acid and washed free of electrolyte with distilled water. The phase ratios were 1:1 parts by volume. The washed organic phase was dried over sodium sulfate, filtered, and dried at 100° C. over 16 hours in a vacuum drying cabinet. The results are summarized in Table 1.

Comparison Example 1

1078.80 g (3.48 moles) of bisphenol TMC, 891.16 g (4.16 moles) of diphenyl carbonate and 0.9874 g ($1.6 \times 10^{-3}$ mole)

of tetraphenylphosphonium phenolate were weighed out into a stirred vessel. The vessel was freed from atmospheric oxygen by applying a vacuum and flushing with nitrogen (three times) and the mixture was melted at 150° C. and 100 mbar. The temperature was raised to 190° C. and the phenol formed was distilled off over 60 minutes. The temperature was increased to 235° C., and after 15 minutes, the vacuum was adjusted to 60 mbar and after a further 15 minutes, the temperature was adjusted to 250° C. After another 15 minutes, the temperature was raised to 280° C. and 292.50 g (0.52 mole) of Pripol 1009 were added and the whole was stirred for 1 hour. The vacuum was reduced to 0.5 mbar and the mixture was stirred for a further 75 minutes. The results are summarized in Table 1.

Comparison Example 2

1078.80 g (3.48 moles) of bisphenol TMC, 908.29 g (4.24 moles) of diphenyl carbonate and 0.9874 g ($1.6 \times 10^{-3}$ mole) of tetraphenylphosphonium phenolate were weighed out into a stirred vessel. The vessel was freed from atmospheric oxygen by applying a vacuum and flushing with nitrogen (three times) and the mixture was melted at 150° C. and 100 mbar. The temperature was raised to 190° C. and the phenol formed was distilled off over 60 minutes. The temperature was increased to 235° C. and after 30 minutes, the vacuum was raised to 60 mbar and 292.50 g (0.52 mole) of Pripol 1009 was added. After a further 15 minutes, the temperature was raised to 250° C. and the vacuum was adjusted to 5 mbar. After another 15 minutes, the temperature was raised to 280° C. and after 15 minutes the vacuum was adjusted to 0.5 mbar, following which the temperature was adjusted to 300°°C. and the whole was stirred for a further 90 minutes. The results are summarized in Table 1.

TABLE 1

| Example | ηrel | Color No. | % OH | x | y | z |
|---|---|---|---|---|---|---|
| Ex. 1 | 1.257 | 0.081 | | 19.8 | 0 | 0 |
| Comp. Ex. 1 | 1.179 | 0.157 | 0.036 | 18.8 | 0 | 0 |
| Comp. Ex. 2 | 1.183 | 0.522 | 0.006 | 18.6 | 0 | 0 |

The examples clearly demonstrate the surprising superiority of the process according to the present invention for producing polyester carbonates that have a significantly improved color number while the other properties remain comparatively unchanged.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polymeric polyester carbonate comprising:
    (a) producing polyester carbonate oligomers by a melt transesterification process; and
    (b) condensing, via a phase interface process, the polyester carbonate oligomers of step (a) with phosgene, thereby forming polymeric polyester carbonate.

2. The polyester carbonate produced by the process of claim 1.

3. In a process for the production of at least one of molded parts and extrudates, the improvement comprising including the polymeric polyester carbonate produced by the process of claim 1.

4. The molded parts and extrudates produced by the process claim 3.

5. An optical storage medium produced by the process of claim 3.

6. The process of claim 1, wherein the transesterification process (a) includes at least one dicarboxylic acid of the formula (I)

$$\text{HOOC—T—COOH} \qquad (I)$$

wherein T represents a branched or linear, saturated or unsaturated alkyl, arylalkyl or cycloalkyl radical consisting of 8–40 carbon atoms.

7. The process of claim 6, wherein the at least one dicarboxylic acid is a saturated, linear alkyl diacid with 8–40 carbon atoms.

8. The process of claim 6, wherein the at feast one dicarboxylic acid is a saturated, linear alkyl diacid with 12 to 36 carbon atoms.

9. The process of claim 6, wherein the at least one dicarboxylic acid is a fatty acid.

10. The process of claim 6, wherein the at least one dicarboxylic acid is selected from the group consisting of sebacic acid, dodecanedioic acid, stearic acid, palmitic acid, and hydrogenated dimeric fatty acids.

11. The process of claim 6, wherein the at least one dicarboxylic acid is a hydrogenated, dimeric fatty acid.

12. The process of claim 6, wherein the at least one dicarboxylic acid is dodecanedioic acid.

13. The process of claim 1, wherein the transesterification process (a) includes at least one dihydroxy compound of the formula (I)

$$\text{HO—Ar—OH} \qquad (I)$$

wherein Ar represents an optionally substituted aromatic radical with 6 to 30 carbon atoms, which may contain one or more aromatic nuclei, and may contain at least one of aliphatic radicals, cycloaliphatic radicals, alkylaryl radicals and heteroatoms as bridge members.

14. The process of claim 13, wherein the at least one dihydroxy compound is selected from the group consisting of hydroquinone, resorcinol, dihydroxydiphenyls, bis-(hydroxyphenyl)alkanes, bis-(hydroxyphenyl)cycloalkanes, bis-(hydroxyphenyl)sulfides, bis-(hydroxyphenyl)ethers, bis-(hydroxyphenyl)ketones, bis-(hydroxyphenyl)sulfones, bis-(hydroxyphenyl)sulfoxides, and α,α'-bis-(hydroxyphenyl)diisopropylbenzenes.

15. The process of claim 13, wherein the at least one dihydroxy compound is selected from the group consisting of 4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)cyclohexane, 1,1-bis-(4-hydroxyphenyl)-4-methylcyclohexane, α,α-bis-(4-hydroxyphenyl)-p-diisopropylbenzene, α,α'-bis-(4-hydroxyphenyl)-m-diisopropylbenzene, bis-(4-hydroxyphenyl)sulfone, bis-(4-hydroxyphenyl)methane, 1,1-bis-(4-hydroxyphenyl)-3,3,5-trimethylcyclohexane, bis-(2,6-dimethyl-4-hydroxyphenyl)propane, bis-(4-hydroxyphenyl)hexafluoropropane, (4-hydroxyphenyl)-1-phenylethane, (4-hydroxyphenyl)diphenylmethane, dihydroxydiphenyl ether, 4,4'-thiobisphenol, bis-(4-hydroxyphenyl)-1-(1-naphthyl)ethane, bis-(4-hydroxyphenyl)-1-(2-naphthyl)ethane, dihydroxy-3-(4-hydroxyphenyl)-1,1,3-trimethyl-1H-inden-5-ol, dihydroxy-1-(4-hydroxyphenyl)-1,3,3-trimethyl-1H-inden-5-ol and 2,2',3,3'-tetrahydro-3,3,3',3'-tetramethyl-1,1'-spirobi[1H-inden]-5,5'-diol.

16. The process of claim 13, wherein the at least one dihydroxy compound is selected from the group consisting of resorcinol, bis-(4-hydroxyphenyl)-1-(1-naphthyl)ethane, bis-(4-hydroxyphenyl)-1-(2-naphthyl)ethane, 2,2-bis-(4-hydroxyphenyl)propane, α,α'-bis-(4-hydroxyphenyl)-p-diisopropylbenzene, α,α'-bis-(4-hydroxyphenyl)-m-diisopropylbenzene, 1,1-bis-(4-hydroxyphenyl)cyclohexane, 4,4'-dihydroxydiphenyl, bis-(4-hydroxyphenyl)-3,3,5-trimethylcyclohexane and bis-(4-hydroxyphenyl)diphenylmethane.

17. The process of claim 13, wherein the at least one dihydroxy compound is selected from the group consisting of bis-(4-hydroxyphenyl)-3,3,5-trimethylcyclohexane, 4,4'-dihydroxydiphenyl and 2,2-bis-(4-hydroxyphenyl)propane.

18. The process of claim 13, wherein the at least one dihydroxy compound is bis-(4-hydroxyphenyl)-3,3,5-trimethylcyclohexane.

19. The process of claim 1, wherein the transesterification process (a) further includes at least one catalyst.

20. The process of claim 1, wherein the transesterification process (a) further includes at least one catalyst of the formula (V),

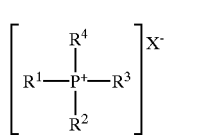

(V)

wherein $R^{1-4}$ independently represent $C_1$–$C_{10}$-alkyl, $C_8$–$C_{10}$-aryl, $C_7$–$C_{10}$-aralkyl or $C_5$–$C_6$-cycloalkyl radicals, and $X^-$ represents hydroxide, sulfate, hydrogen sulfate, hydrogen carbonate, carbonate, a halide or an alcoholate of the formula OR, in which R represents $C_6$–$C_{14}$-aryl or $C_7$–$C_{12}$-aralkyl.

21. The process of claim 19, wherein the at least one catalyst is selected from the group consisting of tetraphenylphosphonium chloride, tetraphenylphosphonium hydroxide and tetraphenylphosphonium phenolate.

22. The process of claim 19, wherein the at least one catalyst is tetraphenylphosphonium phenolate.

23. The process of claim 1, wherein the transesterification process (a) includes at least one diaryl carbonate of the formula (III)

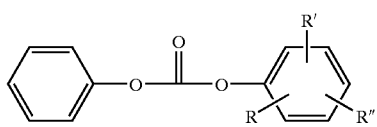

(III)

or of the formula (IV)

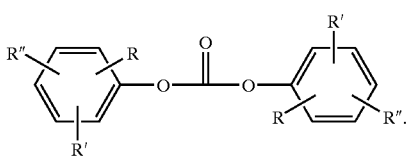

(IV)

wherein R, R' and R" are selected independently for each of formulas (III) and (IV) from H, optionally branched $C_1$–$C_{34}$-alkyl/cycloalkyl, $C_7$–$C_{34}$-alkaryl or $C_6$–$C_{34}$-aryl.

24. The process of claim 23, wherein the at least one diaryl carbonate is selected from the group consisting of diphenyl carbonate, butylphenyl-phenyl carbonate, di-butylphenyl carbonate, isobutylphenyl-phenyl carbonate, di-isobutylphenyl carbonate, tert.-butylphenyl-phenyl carbonate, di-tert.-butylphenyl carbonate, n-pentylphenyl-phenyl carbonate, di-(n-pentylphenyl) carbonate, n-hexylphenyl-phenyl carbonate, di-(n-hexylphenyl) carbonate, cyclohexylphenyl-phenyl carbonate, di-cyclohexylphenyl carbonate, phenylphenol-phenyl carbonate, di-phenylphenol carbonate, isooctylphenyl-phenyl carbonate, di-isooctylphenyl carbonate, n-nonylphenyl-phenyl carbonate, di-(n-nonylphenyl) carbonate, cumylphenyl-phenyl carbonate, di-cumylphenyl carbonate, naphthylphenyl-phenyl carbonate, di-naphthylphenyl carbonate, di-tert.-butylphenyl-phenyl carbonate, di-(di-tert.-butylphenyl) carbonate, dicumylphenyl-phenyl carbonate, di-(dicumylphenyl) carbonate, 4-phenoxyphenyl-phenyl carbonate, di-(4-phenoxyphenyl) carbonate, 3-pentadecylphenyl-phenyl carbonate, di-(3-pentadecylphenyl) carbonate, tritylphenyl-phenyl carbonate and di-tritylphenyl carbonate.

25. The process of claim 23, wherein the at least one diaryl carbonate is selected from the group consisting of diphenyl carbonate, tert.-butylphenyl-phenyl carbonate, di-tert.-butylphenyl carbonate, phenylphenol-phenyl carbonate, di-phenylphenol carbonate, and cumylphenyl-phenyl carbonate and di-cumylphenyl carbonate.

26. The process of claim 23, wherein the at least one diaryl carbonate is diphenyl carbonate.

27. The process of claim 1 further including at least one branching agent.

28. The process of claim 27, wherein the at least one branching agent is selected from the group consisting of phloroglucinol, 4,6-dimethyl-2,4,6-tri-(4-hydroxyphenyl)-heptene-2,4,6-dimethyl-2,4,6-tri-(4-hydroxyphenyl) heptane, 1,3,5-tri-(4-hydroxyphenyl)benzene, 1,1,1-tri-(4-hydroxyphenyl)ethane, tri-(4-hydroxyphenyl)-phenylmethane, 2,2-bis-[4,4-bis-(4-hydroxyphenyl)cyclohexyl]-propane, 2,4-bis-(4-hydroxyphenylisopropyl)phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)phenyl)orthoterephthalic acid ester, tetra-(4-hydroxyphenyl)methane, tetra-(4-(4-hydroxyphenylisopropyl)phenoxy)-methane, 1,4-bis-(4',4"-dihydroxytriphenyl)methyl)-benzene, 2,4-dihydroxybenzoic acid, trimesic acid, cyanuric chloride and 3,3-bis-(3-methyl-4-hydroxyphenyl)-2-oxo-2,3-dihydroindole.

29. The process of claim 27, wherein the at least one branching agent is selected from the group consisting of 1,1,1-tri-(4-hydroxy-phenyl)ethane and isatin biscresol.

30. The process of claim 1, wherein the addition of a dicarboxylic acid to the reaction mixture during the formation of the olgomers is effected after a precondensation of a dihydroxy compound and a diaryl carbonate.

31. The process of claim 1, wherein during the phase interface process (b) another dihydroxy compound is added.

32. A process for the production of polymeric polyester carbonate comprising:
    (a) producing polyester carbonate oligomers by a melt transesterification process; and
    (b) condensing the polyester carbonate oligomers of step (a), via a phase interface process, thereby forming polymeric polyester carbonate,
wherein the transesterification process (a) includes at least one dicarboxylic acid which is a saturated, linear alkyl diacid with 8–40 carbon atoms.

33. The process of claim 32 wherein said dicarboxylic acid is a saturated, linear alkyl diacid with 12 to 36 carbon atoms.

34. A process for the production of polymeric polyester carbonate comprising:
   (a) producing polyester carbonate oligomers by a melt transesterification process; and
   (b) condensing the polyester carbonate oligomers of step (a), via a phase interface process, thereby forming polymeric polyester carbonate,
wherein the transesterification process (a) includes at least one dicarboxylic acid which is a dimeric fatty acid.

35. The process of claim 34 wherein the dicarboxylic acid is selected from the group consisting of sebacic acid, dodecanedioic acid, stearic acid, palmitic acid, and hydrogenated dimeric fatty acids.

36. The process of claim 34 wherein the dicarboxylic acid is a hydrogenated dimeric fatty acid.

37. The process of claim 34 wherein the dicarboxylic acid is dodecanedioic acid.

38. A process for the production of polyester carbonate comprising:
   (a) producing polyester carbonate oligomers by a melt transesterification process; and
   (b) condensing the polyester carbonate oligomers of step (a), via a phase interface process, thereby forming polymeric polyester carbonate,
wherein the phase interface process (b) includes adding another dihydroxy compound and phongene.

39. The process of claim 9 wherein said fatty dicarboxylic acid comprises a combination of fatty dicarboxylic acids represented by the following formulas,

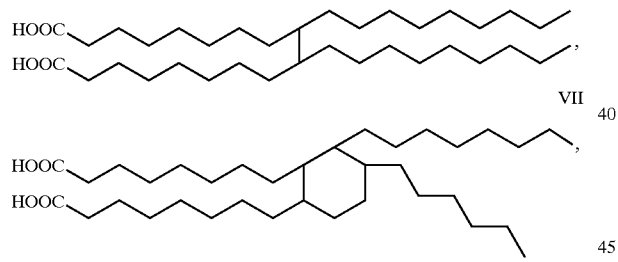

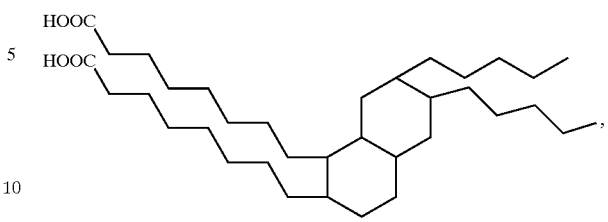

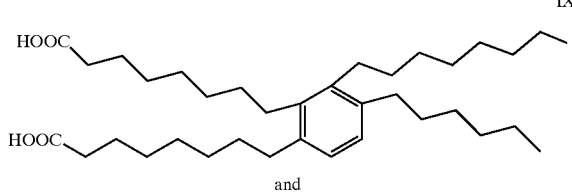

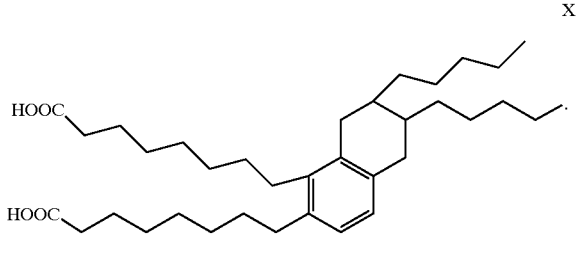

40. The process of claim 39 wherein said combination of fatty dicarboxylic acids contains, 30 percent of the fatty dicarboxylic acid represented by formula VI, 50 percent of the fatty dicarboxylic acids represented by formulas VII and VIII, and 15 to 20 percent of the fatty dicarboxylic acids represented by formulas IX and X.

* * * * *

UNITED STATES PATENT AND TRADEMARK OFFICE
CERTIFICATE OF CORRECTION

PATENT NO. : 6,734,278 B2
DATED : May 11, 2004
INVENTOR(S) : Silke Kratschmer et al.

It is certified that error appears in the above-identified patent and that said Letters Patent is hereby corrected as shown below:

Column 15,
Line 31, delete "$C_8$-$c_{10}$-aryl" and insert -- $C_6$-$c_{10}$-aryl --.

Signed and Sealed this

Sixteenth Day of November, 2004

JON W. DUDAS
*Director of the United States Patent and Trademark Office*